United States Patent [19]

Martin

[11] 4,187,455
[45] Feb. 5, 1980

[54] STEPPER MOTOR FEEDBACK IN POSITION SERVO LOOP

[75] Inventor: Anthony N. Martin, Simsbury, Conn.

[73] Assignee: United Technologies Corporation, Hartford, Conn.

[21] Appl. No.: 601,816

[22] Filed: Aug. 4, 1975

[51] Int. Cl.² ............................................. G05B 11/18
[52] U.S. Cl. .................................. 318/594; 318/685
[58] Field of Search ............... 318/569, 600, 601, 638, 318/648, 652, 671, 685, 696, 594

[56] References Cited

U.S. PATENT DOCUMENTS

| | | | |
|---|---|---|---|
| 3,370,289 | 2/1968 | Hedgcock | 318/685 |
| 3,586,953 | 6/1971 | Markkanen et al. | 318/685 |
| 3,783,357 | 1/1974 | Ichiyanage | 318/685 |

*Primary Examiner*—Gene Z. Rubinson
*Assistant Examiner*—Eugene S. Indyk
*Attorney, Agent, or Firm*—M. P. Williams

[57] ABSTRACT

The actual drive signals to a stepper motor which rotates a mechanical device provide low order bits used in place of the low order bits of a digital word derived from an analog position sensor, to provide an accurate feedback word for subtraction from a digital position command word so as to generate a position error signal to drive the stepper motor in a servo loop.

2 Claims, 1 Drawing Figure

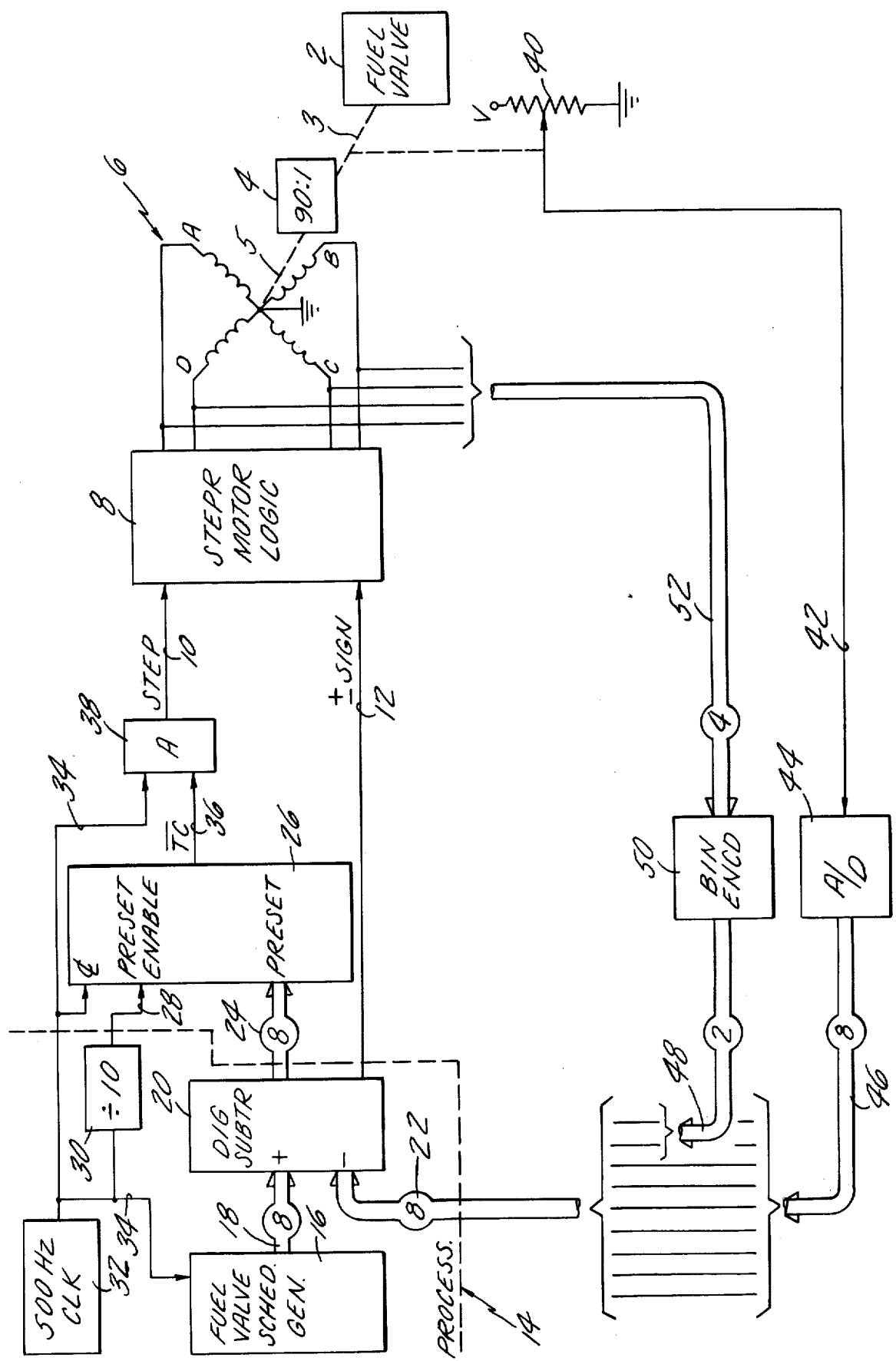

STEPPER MOTOR FEEDBACK IN POSITION SERVO LOOP

BACKGROUND OF THE INVENTION

1. Field of Invention

This invention relates to electrically controlled rotary positioning systems, more particularly to a stepper motor positioning servo loop.

2. Description of the Prior Art

There are many known applications in which electric signals cause positioning of mechanical devices, particularly rotary devices. One example is in the actuation of rotary valves in engine fuel control systems, in which a fuel schedule is converted into a required valve position. For accuracy, it is common to take positioning information from the mechanical device and feed it back for combination with the demand signal so as to drive the mechanical device with an error signal, in a typical, known servo loop. In some applications, it is desired to have fail safe operation; that is, should power be lost, position of the mechanical device would not be changed; therefore, it is frequently desirable to use a known stepper motor to rotate a mechanical device, rather than a torque motor or other rotary electromechanical transducers. However, to provide feedback from a stepper motor requires the use of an analog positional feedback sensor, or requires tracking of the position caused by the stepper motor. When tracking is important, some form of counter, which may comprise a portion of a digital processor which generates the positional demand signals, must remember the position which should have been attained by the mechanical device in response to the commands given to the stepper motor; but this is open-loop tracking and is subject to errors resulting when there is a failure of response for one reason or another; and it is generally subject to volatility—that is, if power is lost, the tracking information stored in memory is also lost. This form of tracking is therefore not useful in airborne applications which demand that a system be able to tolerate power outages extending over a duration of seconds or more, or in critical applications (such as control of engine fuel valve) in which failure to properly track in an open-loop fashion could be catastrophic. On the other hand, rotary position sensors, such as potentiometers, or rotary variable displacement transformers, resolvers and the like, are generally quite temperature sensitive and produce large errors over moderate temperature ranges; when the position being sensed is adjacent to a widely varying heat source, such as an aircraft engine, the errors induced can be prohibitively large, or very sophisticated sensors with or without additional temperature compensation can render the cost of such positional sensors prohibitively high for any applications.

A particular example of the foregoing considerations is found in missiles having air breathing engines. In some applications they may be launched at sea level and in others they may be launched from very high altitudes (such as from an aircraft). The difficulty in starting such an engine is related in part to the accuracy of fuel flow provided as a function of ambient pressure; starting, of course, is done with relatively lower temperatures in the ambient surrounding the engine; but thereafter, guidance and control of the missile include controlling of fuel in a rather precise fashion at elevated temperatures. Due to the fact that the missile is a self-destructing weapon, the fuel control system is used only once and is then naturally destroyed upon detonation of the missile. Therefore, both low cost and a certain degree of accuracy are required.

SUMMARY OF THE INVENTION

The object of the present invention is to provide a high degree of accuracy in a servo loop employing a stepper motor with an analog position sensor feeding the feedback loop.

According to the present invention, signals used to drive a stepper motor are converted to binary bits which are used as low order bits in place of the low order bits derived by an analog-to-digital converter from an analog position sensor, so as to provide a digital position feedback word having accuracy to the accuracy of the stepper motor, for the accurate generation of a position error signal that controls the stepper motor.

The present invention utilizes a low cost analog position sensor, having relatively poor accuracy as a function of temperature and position, while achieving much higher accuracy by supplanting the low order bits of a digital word derived from the analog-sensed position with low order bits directly relating to the actual position of the stepper motor which rotates the mechanical device. Thus low cost and accuracy are combined in a stepper motor position servo loop.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

The sole FIGURE herein comprises a schematic block diagram of a preferred embodiment of the present invention.

DESCRIPTION OF THE PREFERRED EMBODIMENT

Referring now to the drawing, a fuel valve 2 is coupled through a shaft 3 to a 90:1 gear reduction 4 which in turn is coupled through a shaft 5 to a stepper motor 6 in such a fashion that the fuel valve 2 is rotated one revolution for 90 revolutions of the stepper motor 6. However, depending on use, the fuel valve may never achieve a full revolution, and may typically have positions of between 0° and 200°. The stepper motor, being of a well-known type, has four windings A–D, two of which are energized at one time so as to position a permanent magnet rotor (not shown) in alignment between the two energized windings, the rotor being coupled to the shaft 5. The stepper motor 6 is driven by a stepper motor logic circuit 8, which is responsive to a step command signal on a line 10 concurrently with a sign signal on a line 12 to energize a particular pair of windings (such as winding A and winding B) in dependence on the present position of the stepper motor and the desired direction in which an incremental step is to be made. This logic may typically comprise a plurality of storage latches or flip flops, the outputs of which are compared in gate circuits with the sign signal on the line 12, such that if windings A and B are currently energized and a step command comes in with a positive sign signal, the logic would determine that windings B and C should be energized so as to advance the stepper motor in a positive direction; similarly, if windings C and D are currently energized (as is recorded by the latches or flip flops in the logic circuit 8) when a step command is received with a negative sign, then winding D would be de-energized and winding B would be energized so that windings C and B would cause rotation of the rotor one increment (90°) in the backward direction. All of this is well known in the art and forms no part of the present invention.

The desired position of the fuel valve 2 is typically determined by some form of processor 14 which includes a fuel valve schedule generator 16 that provides an eight bit digital word on a trunk of lines 18 representative of desired fuel flow rate as translated to fuel valve position. For instance, in the present embodiment, it is assumed that the binary valve represented on the trunk of eight lines 18 translates simply to one degree per decimal value equivalent. The trunk of eight lines 18 is fed to the positive input of a digital subtractor 20, a negative input of which is provided by a digital word on a trunk of eight lines 22 representing the position of the valve, as is described more fully hereinafter. The digital subtractor 20 therefore provides an output on a trunk of eight lines 24 representative of the error: that is, the difference between the desired position and the actual position of the fuel valve at any given moment. This digital word on the trunk of lines 24 is used to preset an error counter 26 in response to a clock signal on a line 28 which is presented to a preset enable input of the error counter 26. The clock signal on the line 28 may be, for instance, on the order of 50 Hz and therefore may be provided by a divide-by-ten counter 30, which is connected to a 500 Hz clock 32 by a line 34 that may also be used to control the other elements of the processor 14. In response to the presence of the clock signal at the preset input, the error counter could be preset to the complement of the desired advancement of the stepper motor, thereby to permit providing step commands on the line 10 to the stepper motor 8 until the counter has determined that enough steps have been provided. Then, the complement of the terminal count on a line 36 may be used to block a gate 38 to prevent clock signals on the line 34 from providing any further step command signals on the line 10. Clock signals on the line 34 are also used to advance the error counter by being applied to its clock input. Thus, in a typical 50 Hz processor cycle (20 milliseconds), the processor determines a desired fuel schedule, and therefore a desired fuel valve position, and presents that information as a digital word on the line 18, and sampling of the error signal on the line 24 presets the counter 26. During the next cycle of the processor 14, the stepper motor 6 is advanced concurrently with the error counter until the desired number of steps have been provided by the stepper motor. The clock 32 and digital subtractor 20 could be provided, if desired, as a portion of a multi-purpose computer within an overall processor 14, if desired, or these functions may be separately provided as illustrated in the drawing; all of this is well within design skill and choice in the art and forms no part of the present invention.

To provide the feedback signal on the lines 22, the shaft 3 which drives the fuel valve 2 is also coupled to a feedback potentiometer 40 which provides an analog signal on a line 42 indicative of the position of the shaft 3 and therefore of the fuel valve 2. As described hereinbefore, the signal on the line 42 may vary by as much as two percent over temperature and position within the temperature environment of the valve 2. It is the overcoming of this error to which the present invention is particularly directed. The signal on the line 42 is converted to an eight bit digital word by an analog-to-digital converter 44 having a suitable scale factor so that, in this embodiment, the eight bit digital word represents the decimal equivalent of the number of degrees of actual fuel valve rotation. This digital word is provided on the trunk of eight lines 46. However, only the six highest ordered bits of the digital on the lines 46 is utilized, the two lowest order bits being discarded. In place thereof, two low order bits are provided by a trunk of two lines 48 from a binary encoder 50 which is responsive to the actual drive signals to the windings A-D of the stepper motor 6 by being coupled thereto by a trunk of four lines 52. (There may be included, in the trunk of lines 52, logic level conversion circuits so as to convert the signals for driving the stepper motor 6 to suitable transistor logic signals. This, too, is well known in the art and forms no part of the present invention.)

The binary encoder 50 simply converts the drive to the stepper motor 6 to a binary equivalent: for instance, driving of windings A and B concurrently can be decoded to a binary word 00, B and C to binary word 01, C and D to binary word 10, and D and A to binary word 11, which therefore provides on the trunk of two lines 48 a binary word representing decimal values 0-3 indicative of the four quadrant positions of the stepper motor 6. These have a digital value of one per quarter revolution of the stepper motor, and the stepper motor provides ninety revolutions per revolution of the valve, so this also translates to a decimal value of ONE per degree of valve position.

Upon initial operation of the device, it is necessary to align the stepper motor with the position of the valve so that the fraction of position represented by the stepper motor is known to the system. This can simply be done by energizing any two coils (such as the coils A and B) which represents any known position of the stepper motor (for instance a zero rotation with respect to the fuel valve), after which the fuel valve can be positioned against one of its stops or the other (such as completely closed and representing a zero degree position). Thereafter, the stepper motor and fuel valve will track in a repetitive fashion.

The precept of the present invention is in providing accuracy, to a single degree, in the digital feedback word on the lines 22 by throwing away the two lowest order bits derived from the potentiometer or other analog rotary position sensor, and substituting therefore the discrete positions of the stepper motor as actually determined by the stepper motor energization at all times. This provides tracking granularity to a single degree of rotation of the valve; and this provides repeatable accuracy to the same degree as the initial alignment, which may be on the order of a tenth of a degree of valve positioning.

The invention has been described herein with respect to control of a fuel valve in response to digital signals, utilizing a stepping motor. However, instead of a stepper motor, if desired, a reluctance motor may be used, although this may be disadvantageous in some applications due to the fact that it allows a certain degree of slippage to occur. Similarly, although a 90:1 gear reduction is disclosed, other gear ratios, of course, could be used if desired. Instead of a potentiometer 40, a rotary variable differential transformer 8, resolver, or other analog shaft position mechanical to electrical transducer may be utilized in conjunction with the A/D converter 44. Similarly, other schemes for utilizing the error signal provided by the processor 14 in order to appropriately drive the stepper motor logic 8 may be employed as desired; for instance, pulse rate systems, using direct comparisons of frequency inputs, may be used to drive the stepper motor 8 if desired, as is known in the art. The error counter 26 could, of course, be preset to the desired number of steps and counted down, and the individual stages ORed to provide an enable signal for the gate 38, if desired.

Thus although the invention has been shown and described with respect to a preferred embodiment thereof, it should be understood by those skilled in the art that the foregoing and various other changes, omissions and additions may be made thereto without departing from the spirit and the scope of the invention.

Having thus described a typical embodiment of my invention, that which I claim as new and desire to secure by Letters Patent is:

1. A stepping motor position servo loop comprising:
   a rotary mechanical device;
   a stepper motor having a plurality of separately-energizable windings and a rotor mechanically connected to said mechanical device for rotating said device to a position determined by the particular windings which are energized by signals applied thereto;
   first means connected to said mechanical device for generating a first digital word indicative of the position of said mechanical device comprising a plurality of high order data bits and a number of low order data bits;
   second means separately connected to each of the windings of said stepper motor and responsive to the particular windings being energized for generating a second digital word having said number of bits and representative of the position of said stepper motor;
   third means for presenting a digital word indicative of a position command for said mechanical device;
   means responsive to said first, second and third means for subtracting a digital word, consisting of said second digital word and said plurality of high order bits of said first digital word, from said position command digital word for generating a position error manifestation; and
   means responsive to said position error manifestation for applying signals to particular windings of said stepper motor for controlling the position thereof and over corresponding connections to said second means.

2. The servo loop according to claim 1 further comprising:
   a gear reduction unit interposed between said stepper motor and said mechanical device such that many revolutions of said stepper motor result in less than one revolution of said mechanical device; and
   wherein said first means comprises means providing an electrical analog position signal indicative of the position of said mechanical device and an analog-to-digital converter, having a conversion scale factor to provide said first digital word in response to said analog position signal in the same magnitude-per-unit-of-revolution of said mechanical device as said second digital word.

* * * * *